United States Patent
Zhu et al.

(10) Patent No.: US 9,231,488 B2
(45) Date of Patent: Jan. 5, 2016

(54) POWER CONVERTER AND METHOD FOR CONTROLLING THE SAME

(71) Applicant: DELTA ELECTRONICS, INC., Taoyuan Hsien (TW)

(72) Inventors: Xuan-Cai Zhu, Taoyuan Hsien (TW); Bing-Wen Weng, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 111 days.

(21) Appl. No.: 13/732,714

(22) Filed: Jan. 2, 2013

(65) Prior Publication Data

US 2014/0119060 A1  May 1, 2014

(30) Foreign Application Priority Data

Oct. 29, 2012 (CN) .......................... 2012 1 0421131

(51) Int. Cl.
| | |
|---|---|
| H02M 3/335 | (2006.01) |
| H02M 3/337 | (2006.01) |
| H02M 1/10 | (2006.01) |
| H02M 7/5387 | (2007.01) |

(52) U.S. Cl.
CPC ................ *H02M 3/337* (2013.01); *H02M 1/10* (2013.01)

(58) Field of Classification Search
CPC ........... Y02B 70/1416; Y02B 70/1433; Y02B 70/1441; H02M 2007/4815; H02M 2007/4818; H02M 7/4826
USPC ............ 363/15, 16, 17, 98, 132, 21.02, 21.03
See application file for complete search history.

(56) References Cited

U.S. PATENT DOCUMENTS

| | | | |
|---|---|---|---|
| 6,172,882 B1* | 1/2001 | Tanaka et al. .................. | 363/17 |
| 6,930,899 B2 | 8/2005 | Bakran et al. | |
| 6,995,987 B2* | 2/2006 | Song et al. ...................... | 363/98 |
| 8,432,709 B2* | 4/2013 | Huang et al. .................... | 363/17 |
| 2004/0095790 A1 | 5/2004 | Bakran et al. | |
| 2011/0103097 A1 | 5/2011 | Wang et al. | |

FOREIGN PATENT DOCUMENTS

| | | |
|---|---|---|
| CN | 1585253 | 2/2005 |
| CN | 2917082 | 6/2007 |
| CN | 100481694 | 4/2009 |
| CN | 102158089 | 8/2011 |
| CN | 102223086 | 10/2011 |
| CN | 102412726 | 4/2012 |
| TW | M397656 | 2/2011 |
| TW | 201121223 | 6/2011 |

* cited by examiner

*Primary Examiner* — Gary L Laxton
(74) *Attorney, Agent, or Firm* — Hauptman Ham, LLP

(57) ABSTRACT

A power converter includes a full-bridge converter circuit and a regulation circuit. The full-bridge converter circuit includes a full-bridge circuit having a first and a second input terminals and a first and a second output terminals. The regulation circuit is bridged across the first and the second input terminals of the full-bridge circuit and connected to the first output terminal of the full-bridge circuit. The regulation circuit is configured for operatively regulating an output voltage across the first and the second output terminals of the full-bridge circuit by cooperating with the full-bridge converter circuit, such that the output voltage across the first and the second output terminals of the full-bridge circuit has more than three voltage levels. A method for controlling a power converter is also disclosed herein.

19 Claims, 15 Drawing Sheets

POWER CONVERTER AND METHOD FOR CONTROLLING THE SAME

RELATED APPLICATIONS

This application claims priority to Chinese Application Serial Number 201210421131.8, filed Oct. 29, 2012, which is herein incorporated by reference.

BACKGROUND

1. Technical Field

The present disclosure relates to a power converter. More particularly, the present disclosure relates to voltage regulation of a power converter.

2. Description of Related Art

As energy demand increases significantly nowadays, renewable energy generation, such as wind power, fuel cell, solar cells (i.e., photovoltaic cells, PV), etc., becomes more and more attractive. In such application, power conversion with high efficiency, high power density, high reliability and low cost is normally required, particularly for the energy applications with wide range.

Typically, a power converter with high efficiency is provided in the aforementioned power conversion applications and the power converter is usually operated with high switching frequecy under a certain condition. Moreover, soft switching for switch devices in the power converter is performed, and thus high reliability of the power converter can be achieved as well. Resonant converter, such as LLC converter, is one of them which has been widely used.

However, with LLC converter, under the condition that the power converter is operated with frequency modulation, a wide range of switching frequency is necessary when voltage regulation for a wide range of input voltage inputted into the power converter is required, and this results in complex and difficult circuitry design in the power converter. High conversion efficiency is also hard to be guaranteed with a wide range of switching frequency. In other words, the voltage regulation for a wider range of input voltage inputted into the power converter cannot be achieved if the range of switching frequency is not further extended.

SUMMARY

An aspect of the present disclosure is related to a power converter. The power converter includes a bridge circuit having a first and a second input terminals and a first and a second output terminals, a switch module, an isolation stage having a first and a second input terminals and a first and a second output terminals, and an output stage having a first and a second output terminals. The bridge circuit further includes a first bridge arm, a second bridge arm and a third bridge arm. The first bridge arm includes two capacitor units connected in series at a middle point between the first and the second input terminals of the bridge circuit. The second bridge arm includes a first and a second switch devices connected in series at the first output terminal of the bridge circuit. The third bridge arm includes a third and a fourth switch devices connected in series at the second output terminal of the bridge circuit. The switch module is connected between the middle point and the first output terminal of the bridge circuit. The first input terminal of the isolation stage is connected to the first output terminal of the bridge circuit, and the second input terminal of the isolation stage is connected to the second output terminal of the bridge circuit. The first input terminal of the output stage is connected to the first output terminal of the isolation stage, and the second input terminal of the output stage is connected to the second output terminal of the isolation stage.

Another aspect of the present disclosure is related to a method for controlling a power converter, in which the power converter includes a bridge circuit having a first and a second input terminals and a first and a second output terminals, a switch module, an isolation stage connected to the bridge circuit, and an output stage connected to the isolation stage, in which the bridge circuit further includes two capacitor units connected in series at a middle point between the first and the second input terminals of the bridge circuit, a first and a second switch devices connected in series at the first output terminal of the bridge circuit, and a third and a fourth switch devices connected in series at the second output terminal of the bridge circuit, in which the switch module further includes a fifth and a sixth switch devices connected anti-serially between the middle point and the first output terminal of the bridge circuit. The method includes: switching on the first and the sixth switch devices respectively with a first and a sixth driving signals which are complementary; switching on the second and the fifth switch devices respectively with a second and a fifth driving signals which are complementary; and switching on the third and the fourth switch devices respectively with a third and a fourth driving signals which are complementary.

Still another aspect of the present disclosure is related to a power converter including a full-bridge converter circuit and a regulation circuit. The full-bridge converter circuit includes a full-bridge circuit having a first and a second input terminals and a first and a second output terminals. The regulation circuit is bridged across the first and the second input terminals of the full-bridge circuit and connected to the first output terminal of the full-bridge circuit. The regulation circuit is configured for operatively regulating an output voltage across the first and the second output terminals of the full-bridge circuit by cooperating with the full-bridge converter circuit, such that the output voltage across the first and the second output terminals of the full-bridge circuit has more than three voltage levels.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

Figure 1:
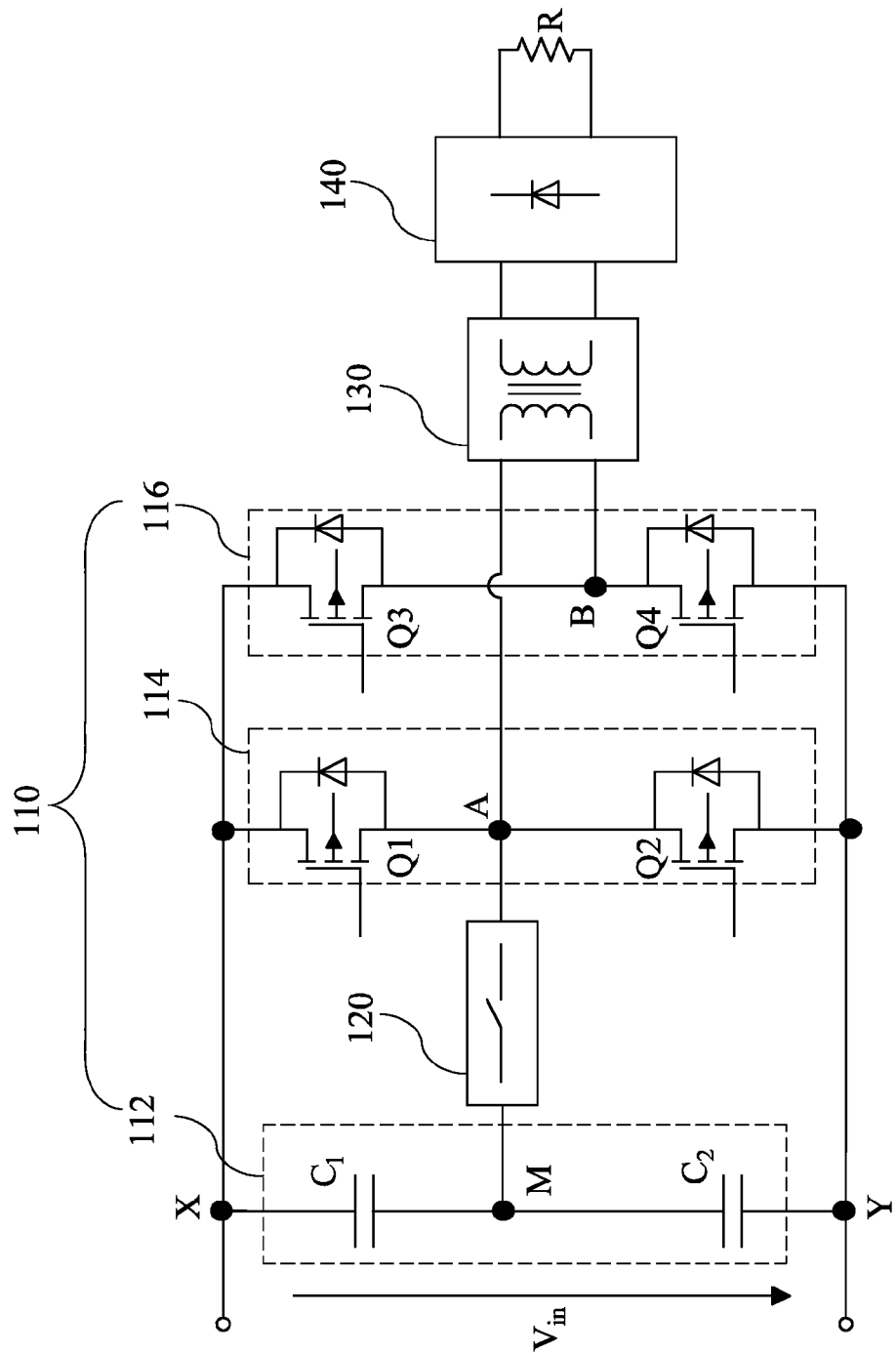
FIG. 1 is a schematic diagram of a power converter according to a first embodiment of the present disclosure.

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples anywhere in this specification, including examples of any terms discussed herein, is illustrative only, and in no way limits the scope and meaning of the disclosure or of any exemplified term. Likewise, the present disclosure is not limited to various embodiments given in this specification.

As used herein, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Connected" and "coupled" may still be used to indicate that two or more elements cooperate or interact with each other.

FIG. 1 is a schematic diagram of a power converter according to a first embodiment of the present disclosure. As shown in FIG. 1, the power converter 100 includes a bridge circuit (e.g., a full-bridge inverter) 110, a switch module 120, an isolation stage 130 and an output stage 140. The bridge circuit 110 has a first input terminal X and a second input terminal Y both configured for receiving an input voltage Vin, and a first output terminal A and a second output terminal B both configured for generating an output voltage $V_{AB}$ therebetween. The bridge circuit 110 further includes bridge arms 112, 114, and 116. The bridge arm 112 includes two capacitor units C1 and C2 connected in series at a middle point M between the first input terminal X and the second input terminal Y of the bridge circuit 110. The bridge arm 114 includes switch devices Q1 and Q2 connected in series at the first output terminal A between the first input terminal X and the second input terminal Y of the bridge circuit 110. The bridge arm 116 includes switch devices Q3 and Q4 connected in series at the second output terminal B between the first input terminal X and the second input terminal Y of the bridge circuit 110.

The switch module 120 is connected between the middle point M and the first output terminal A of the bridge circuit 110. The isolation stage 130 has a first and a second input terminals and a first and a second output terminals, in which the first input terminal of the isolation stage 130 is connected to the first output terminal A of the bridge circuit 110, and the second input terminal of the isolation stage 130 is connected to the second output terminal B of the bridge circuit 110. The output stage 140 has a first and a second input terminals, in which the first input terminal of the output stage 140 is connected to the first output terminal of the isolation stage 130, and the second input terminal of the output stage 140 is connected to the second output terminal of the isolation stage 130.

In one embodiment, the isolation stage 130 can further include a transformer having a primary winding connected to the first output terminal A and the second output terminal B of the bridge circuit 110, and a secondary winding connected to the input terminals of the output stage 140, in which the transformer provides matching and isolation for the output voltage of the bridge circuit. In another embodiment, the output stage 140 can further include a rectifying circuit (e.g., a full-bridge rectifier) connected to the output terminals of the isolation stage 130, in which the rectifying circuit can be configured to convert the resonant current into unidirectional current.

In operation, the switch module 120 cooperates with the bridge circuit 110 (and also cooperates with the isolation stage 130 in certain conditions), such that the output voltage $V_{AB}$ across the first output terminal A and the second output terminal B is regulated to have multiple voltage levels. In one embodiment, the bridge circuit 130 is configured for generating the output voltage (or multi-level voltage) $V_{AB}$ having more than three voltage levels across the first output terminal and the second output terminal of the bridge circuit 130. As a result, a range of the input voltage Vin can be extended to be wider at the efficiency optimized point within the allowable range of operation without extending a range of switching frequency for the aforementioned switch devices, resulting in that a range of the output voltage Vo can be extended to be wider at the efficiency optimized point within the allowable range of operation. In addition, the power converter with high efficiency can be realized under an even wider range of the input voltage.

Figure 2:
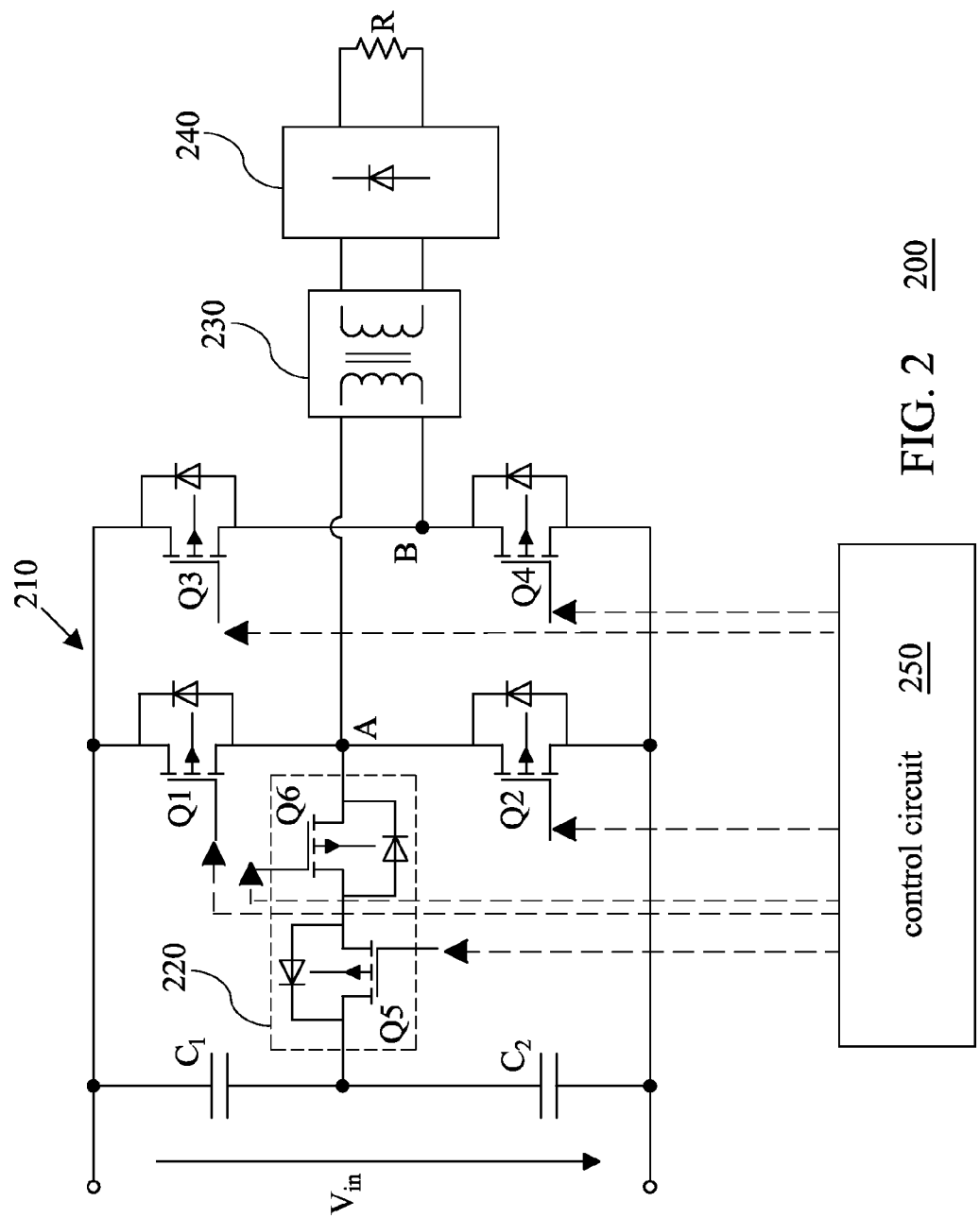
FIG. 2 is a schematic diagram of a power converter according to a second embodiment of the present disclosure.

FIG. 2 is a schematic diagram of a power converter according to a second embodiment of the present disclosure. As shown in FIG. 2, the power converter 200 includes circuits that are similar to those shown in FIG. 1, and thus the circuits are not further detailed herein. Compared to the embodiment shown in FIG. 1, the switch module 220 in the power converter 200 further includes switch devices Q5 and Q6, and the switch devices Q5 and Q6 are connected anti-serially between the middle point M and the first output terminal A of the bridge circuit 210.

Moreover, the power converter 200 may further include a control circuit 250 for controlling the switch devices Q1-Q6, in which the switch devices Q1 and Q6 are switched on complementarily, the switch devices Q2 and Q5 are switched on complementarily, and the switch devices Q3 and Q4 are switched on complementarily. Notably, each of the aforementioned embodiments and following embodiments may further include a control circuit that is similar to or the same as the control circuit 250 in the power converter 200.

In one embodiment, a duty cycle of the switch device Q1 (i.e., a duty cycle of a driving signal for driving the switch device Q1) is smaller than a duty cycle of the switch device Q6, a duty cycle of the switch device Q2 is smaller than a duty cycle of the switch device Q5, and a duty cycle of the switch device Q3 is equal to a duty cycle of the switch device Q4.

Figure 3:
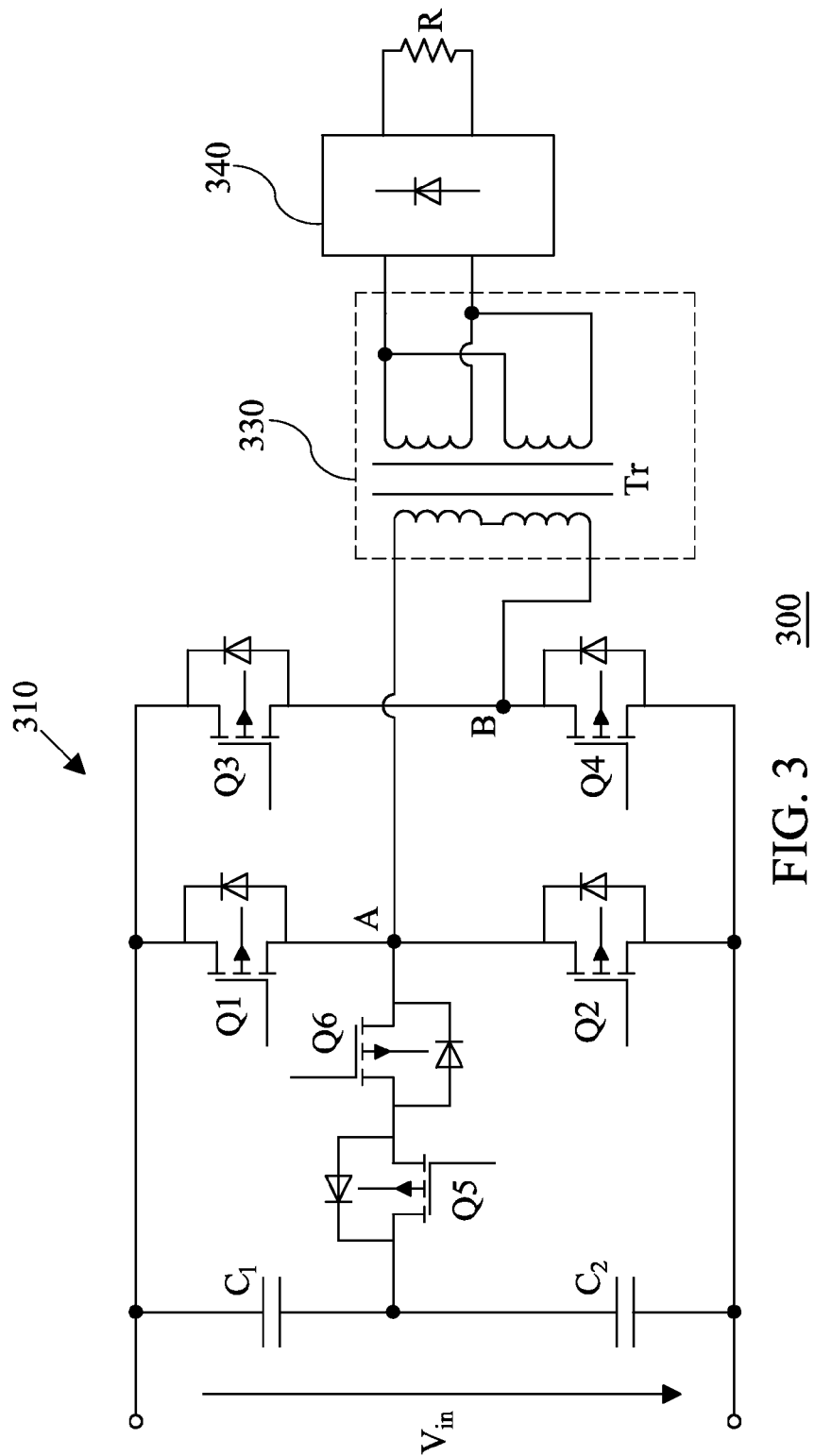
FIG. 3 is a schematic diagram of a power converter according to a third embodiment of the present disclosure.

FIG. 3 is a schematic diagram of a power converter according to a third embodiment of the present disclosure. As shown in FIG. 3, the power converter 300 includes circuits that are similar to those shown in FIG. 2, and thus the circuits are not further detailed herein. Compared to the embodiment shown in FIG. 2, the isolation stage 330 can further include a transformer Tr having a primary winding circuit connected between the first output terminal A and the second output terminal B of the bridge circuit 310, and a secondary winding circuit connected to the input terminals of the output stage 340, as illustrated in FIG. 3.

Figure 4:
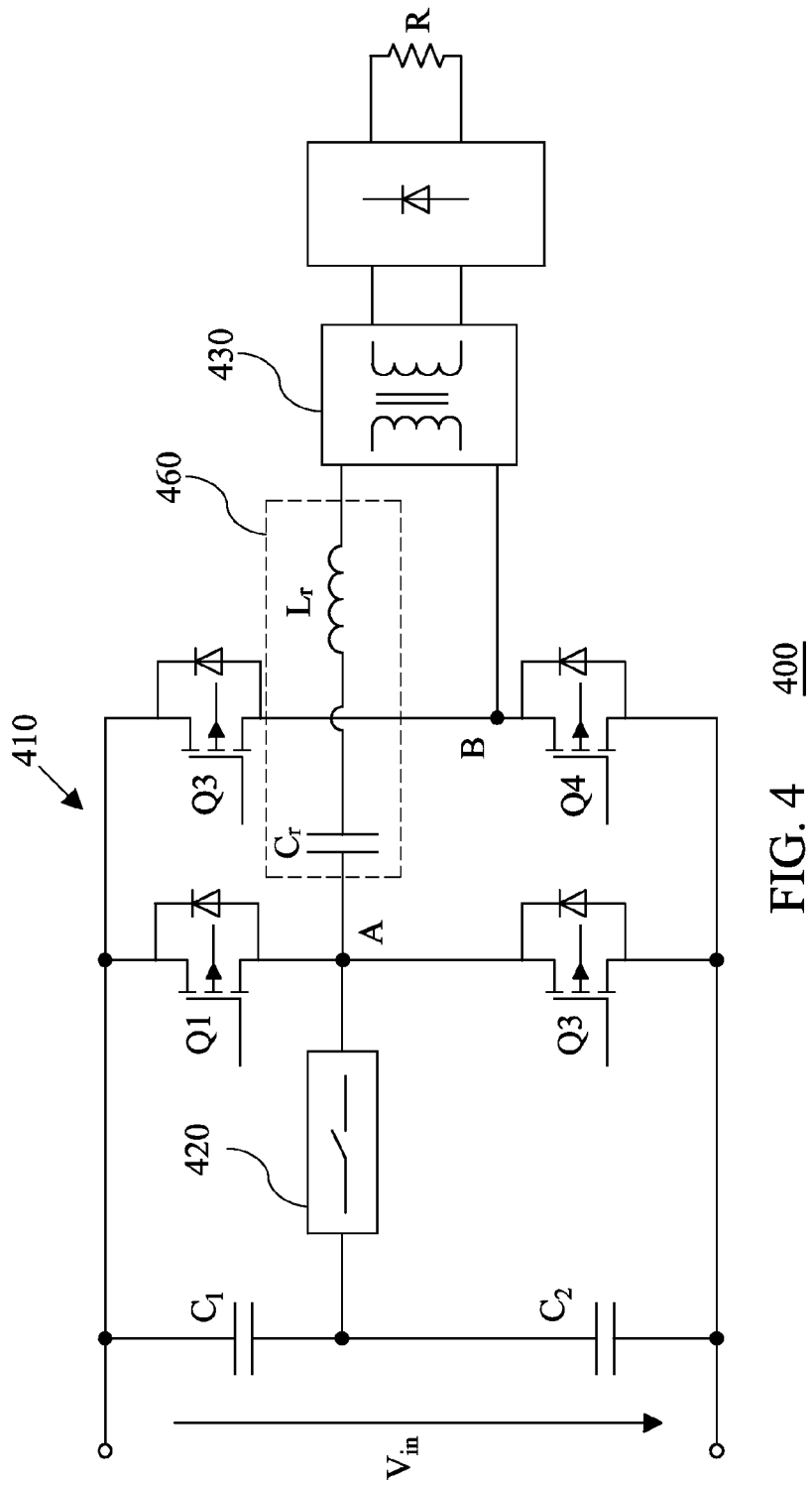
FIG. 4 is a schematic diagram of a power converter according to a fourth embodiment of the present disclosure.

FIG. 4 is a schematic diagram of a power converter according to a fourth embodiment of the present disclosure. As shown in FIG. 4, the power converter 400 includes circuits that are similar to those shown in FIG. 1, and thus the circuits are not further detailed herein. Compared to the embodiment shown in FIG. 1, the power converter 400 further includes a resonant tank 460, and the resonant tank 460 includes a capacitor unit (e.g., a resonant capacitor Cr) and an inductor unit (e.g., a resonant inductor Lr) connected in series between the first output terminal A of the bridge circuit 410 and the isolation stage 430.

In one embodiment, the isolation stage 430 may further include a transformer having a primary winding and a secondary winding, and the resonant capacitor Cr, the resonant inductor Lr and the primary winding of the transformer are connected in series between the first output terminal A and the second output terminal B of the bridge circuit 410.

In operation, the switch module 420 cooperates with the bridge circuit 410 and the resonant tank 460 (and also cooperates with the isolation stage 430 in certain conditions), such that the output voltage $V_{AB}$ across the first output terminal A and the second output terminal B of the bridge circuit 410 is regulated to have more than three voltage levels. As a result, a range of the input voltage Vin can be extended to be wider without extending a range of switching frequency for the aforementioned switch devices.

Figure 5:
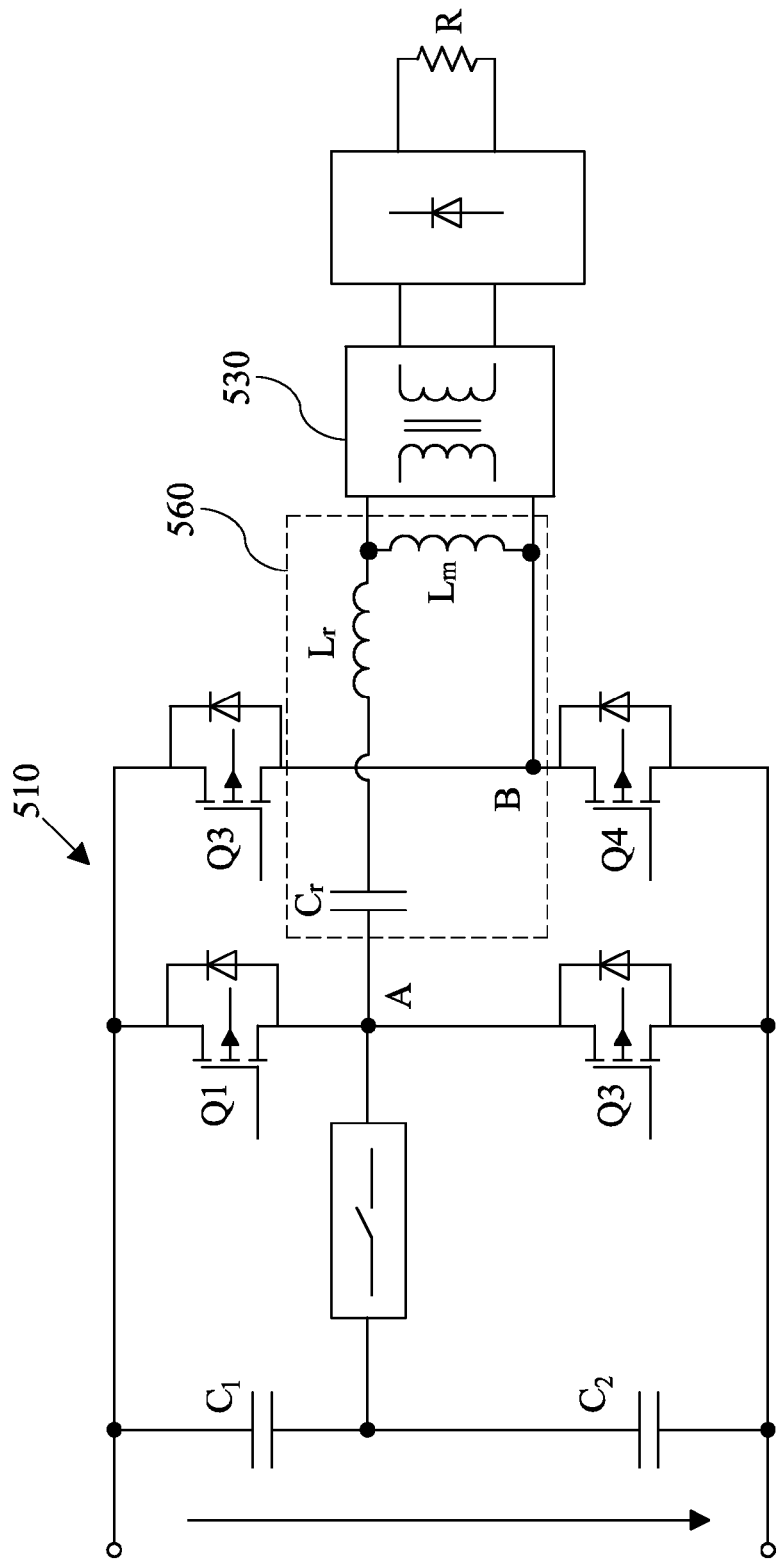
FIG. 5 is a schematic diagram of a power converter according to a fifth embodiment of the present disclosure.

FIG. 5 is a schematic diagram of a power converter according to a fifth embodiment of the present disclosure. As shown in FIG. 5, the power converter 500 includes circuits that are similar to those shown in FIG. 1, and thus the circuits are not described in further detail herein. Compared to the embodiment shown in FIG. 1, the power converter 500 further includes a resonant tank 560, and the resonant tank 560 includes a capacitor unit (e.g., a resonant capacitor Cr), a first inductor unit (e.g., a resonant inductor Lr) and a second inductor unit (e.g., a magnetizing inductor Lm) connected in series between the first output terminal A and the second output terminal B of the bridge circuit 510, in which the magnetizing inductor Lm is connected in parallel with, for example, a primary winding of a transformer in the isolation stage 530.

In practice, the resonant inductor Lr can be implemented by an external component or by the leakage inductance of the transformer in the isolation stage 530, and the magnetizing inductor Lm can be implemented by an external component or by the magnetizing inductance of the transformer in the isolation stage 530. Moreover, each of the aforementioned switch devices can be implemented by a semiconductor switch electrically connected in parallel with a diode (e.g., body diode) and a parasitic capacitor.

On the other hand, the bridge circuit described in the aforementioned embodiments can be characterized with a gain G of the voltage regulation loop in the power converter, in which the gain G can be controlled or varied and is dependent on a first gain G1 and a second gain G2, e.g., $G = a \times G1 + b \times G2$, in which the first gain G1 is obtained when the bridge circuit operates as a half bridge circuit and the second gain G2 is obtained when the bridge circuit operates as a full-bridge circuit. For example, the gain G of the voltage regulation loop in the power converter is adjusted such that regulation of the output voltage begins at a relatively lower level and gradually increases to a maximum level.

Figure 6:
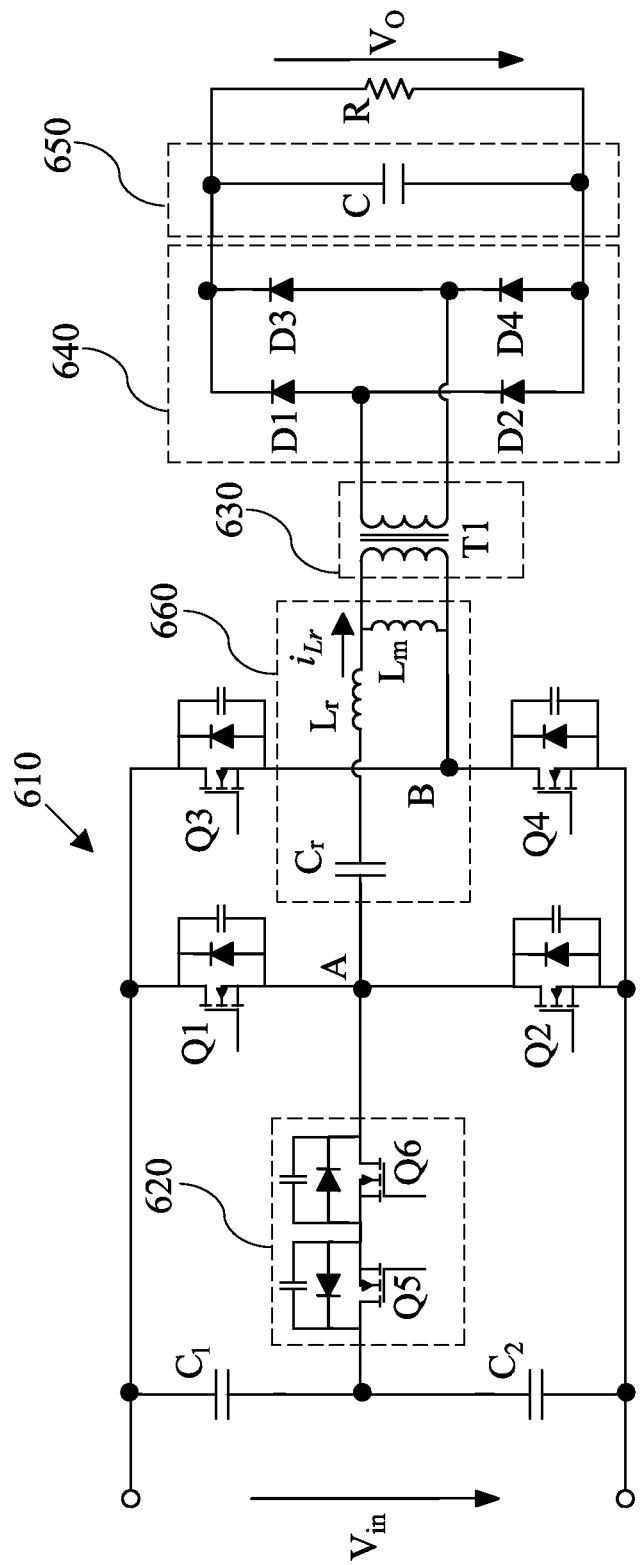
FIG. 6 is a schematic circuit diagram of an exemplary power converter according to a sixth embodiment of the present disclosure.

FIG. 6 is a schematic circuit diagram of an exemplary power converter according to a sixth embodiment of the present disclosure. As shown in FIG. 6, the power converter 600, e.g., an LLC resonant converter, includes a full-bridge circuit 610 (including switch devices Q1-Q4 and capacitors C1 and C2) for receiving a DC input voltage Vin, a switch module 620 (including switch devices Q5-Q6), an isolation stage 630 (including a transformer T1), a rectifier 640 including diodes D1-D4, a filter 650 (including an output capacitor C) for generating a DC output voltage Vo, a resonant tank 660 (including a resonant capacitor Cr, a resonant inductor Lr, and a magnetizing inductor Lm), and a load R for receiving the output voltage Vo. The circuit configuration of the power converter 600 is similar to that described in one or more embodiments mentioned above, and thus it is not further detailed herein.

Figure 7:
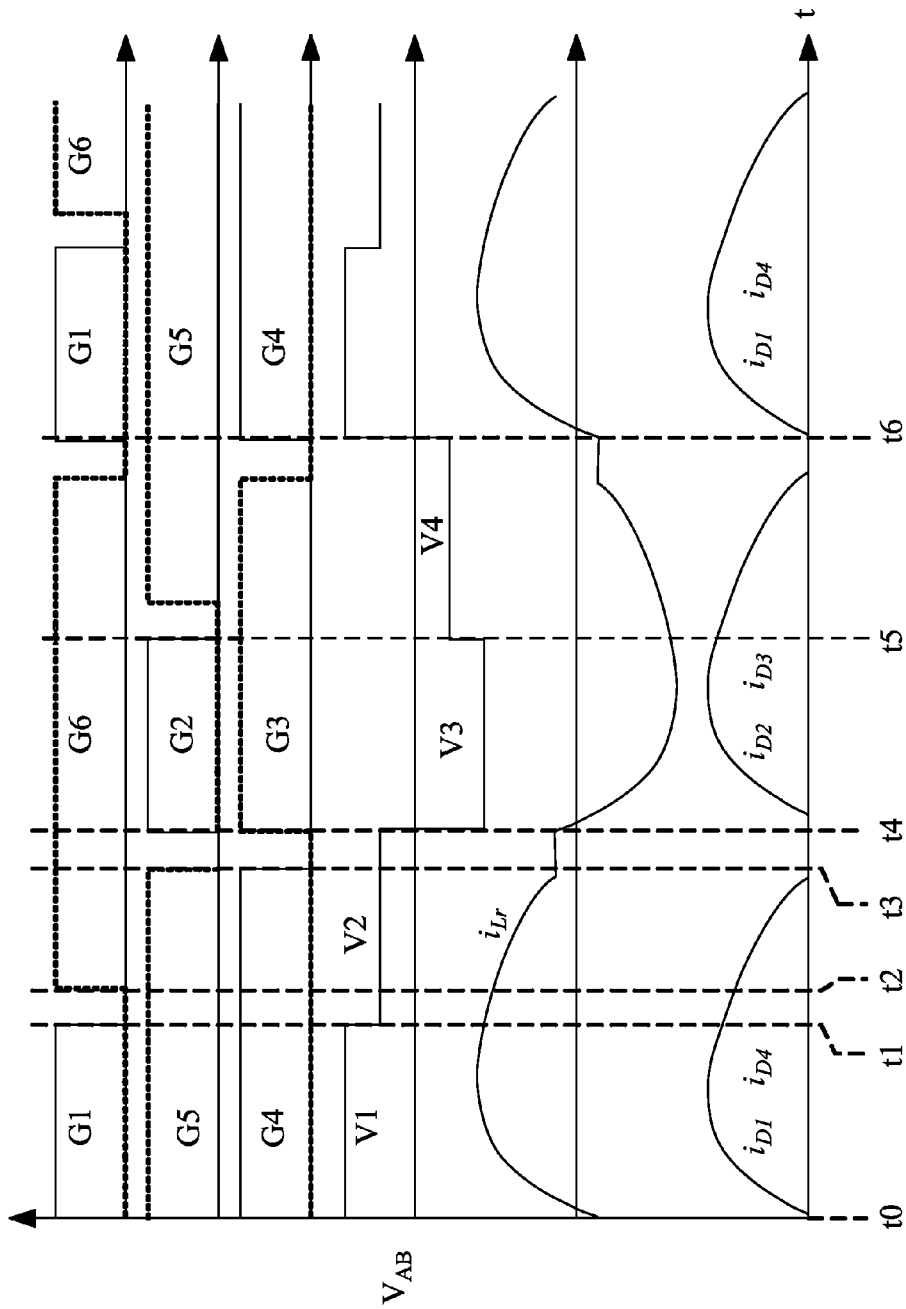
FIG. 7 is a diagram illustrating waveforms regarding the control and regulation of the power converter as shown in FIG. 6, according to one embodiment of the present disclosure.

FIG. 7 is a diagram illustrating waveforms regarding the control and regulation of the power converter as shown in FIG. 6, according to one embodiment of the present disclosure. As shown in FIG. 6 and FIG. 7, driving signals G1-G6 are generated, for example, by the control circuit 250 as shown in FIG. 2, for the switch devices Q1-Q6 respectively, and the output voltage $V_{AB}$ across the first output terminal A and the second output terminal B of the bridge circuit is regulated to have multiple voltage levels according to the operations of the switch devices Q1-Q6 controlled respectively by the driving signals G1-G6. In the present embodiment, the driving signals G1 and G6 are complementary, the driving signals G2 and G5 are complementary, and the driving signals G3 and G4 are complementary. In practice, the driving signals G1-G6 can be configured to be pulse width modulation (PWM) signals or other similar types of control or driving signals.

Moreover, in one embodiment, a duty cycle of the driving signal G1 is smaller than a duty cycle of the driving signal G6, a duty cycle of the driving signal G2 is smaller than a duty cycle of the driving signal G5, and a duty cycle of the driving signal G3 is equal to a duty cycle of the driving signal G4.

Moreover, in another embodiment, the driving signals G1 and G2 can be symmetrical and alternately asserted with a phase shift of 180 degree (i.e., the switch devices Q1 and Q2 are configured to be alternately switched on with a phase shift of 180 degree), the driving signals G3 and G4 can be symmetrical and alternately asserted with a phase shift of 180 degree (i.e., the switch devices Q3 and Q4 are configured to be alternately switched on with a phase shift of 180 degree), and the driving signals G5 and G6 can be symmetrical and alternately asserted with a phase shift of 180 degree (i.e., the switch devices Q5 and Q6 are configured to be alternately switched on with a phase shift of 180 degree).

Moreover in yet another embodiment, the driving signal G1 and the driving signal G4 are asserted simultaneously and the driving signal G1 is then de-asserted in advance, and the driving signal G2 and the driving signal G3 are asserted simultaneously and the driving signal G2 is then de-asserted in advance. In other words, the switch devices Q1 and Q4 are switched on simultaneously with the driving signals G1 and G4 respectively and the switch device Q1 is then switched off in advance, and the switch devices Q2 and Q3 are switched on simultaneously with the driving signals G2 and G3 respectively and the switch device Q2 is then switched off in advance.

FIGS. 8A-8G are diagrams illustrating the operations of the power converter as shown in FIG. 6 according to one embodiment of the present disclosure, in which the dotted lines shown in FIGS. 8A-8G indicate the current paths. The operations of the power converter 600 are exemplified in FIGS. 8A-8G as below in conjunction with the waveforms as shown in FIG. 7.

Figure 8A:
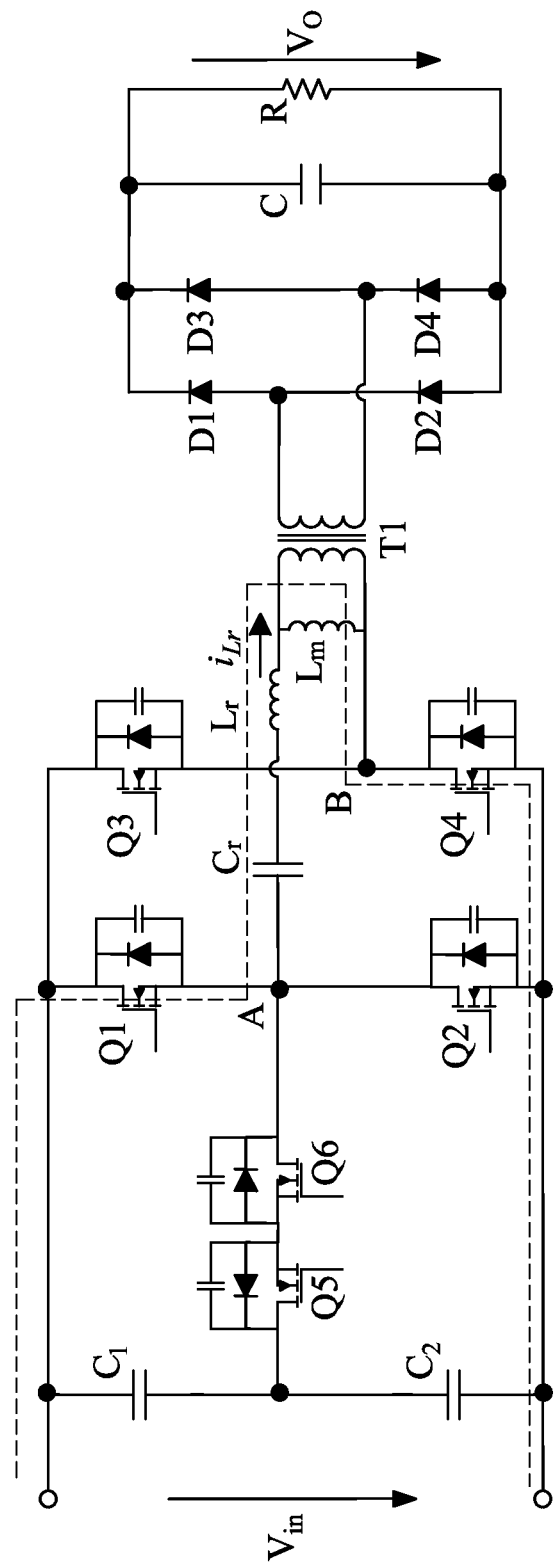
FIGS. 8A-8G are diagrams illustrating the operations of the power converter as shown in FIG. 6 according to one embodiment of the present disclosure.

First, as shown in FIG. 7 and FIG. 8A, at time t0, the driving signals G1 and G4 are asserted such that the switch devices Q1 and Q4 are switched on by the driving signals G1 and G4, respectively. The switch device Q5 may have been switched on before the switch devices Q1 and Q4 are switched on. Moreover, the current flowing toward the switch device Q6 is blocked by the body diode of the switch device Q6. During the time period t0-t1, the power converter operates as a full-bridge LLC converter, and the output voltage $V_{AB}$ across the output terminals A and B of the bridge circuit is regulated to have a voltage level of V1. The input power is converted via the bridge circuit, the resonant capacitor Cr, the resonant inductor Lr, the transformer T1 and the rectifier including diodes D1-D4, into the output power.

Figure 8B:
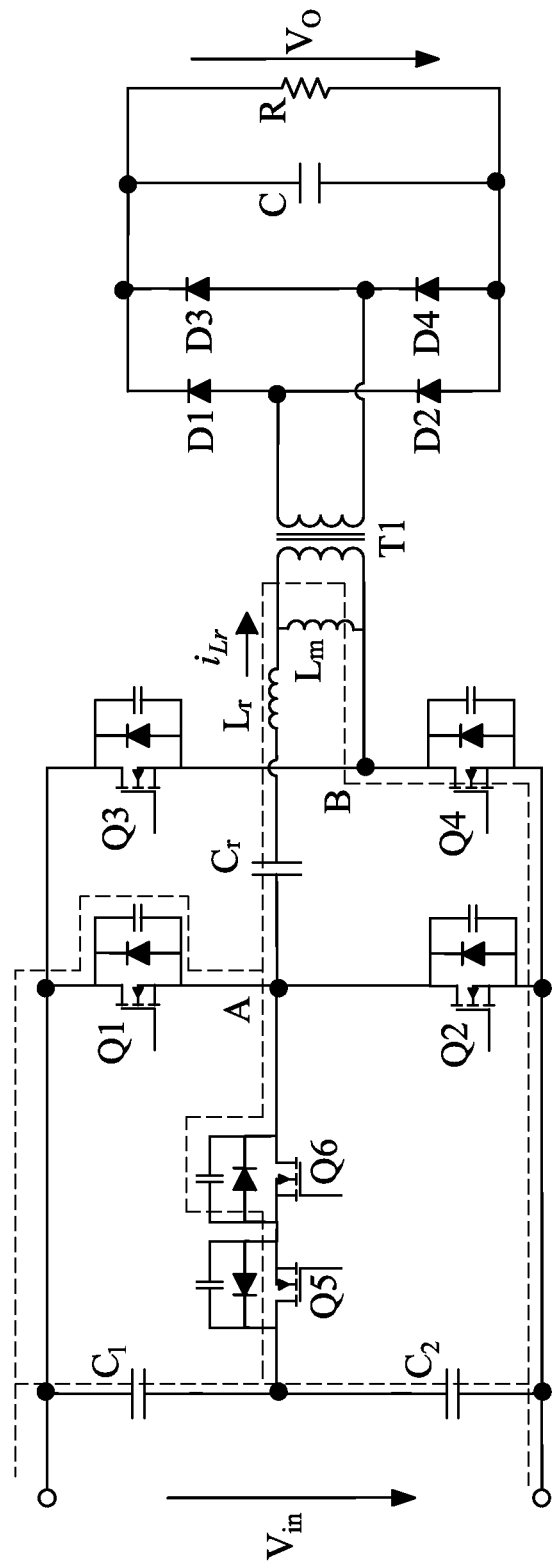

As shown in FIG. 7 and FIG. 8B (a former state of the operation during the time period t1-t2), at time t1, the driving signal G1 is de-asserted such that the switch device Q1 is switched off. During the time period t1-t2, the output voltage $V_{AB}$ across the output terminals A and B of the bridge circuit is regulated to have a voltage level of V2 which is different from V1.

After the switch device Q1 is switched off, the primary current $i_{Lr}$ flowing through the transformer T1 starts to charge the parasitic capacitor of the switch device Q1 and to discharge the parasitic capacitor of the switch device Q6. After the charging and discharging operations are completed, the switch device Q1 is not conducted, and the voltage across the parasitic capacitor of the switch device Q6 becomes zero, such that the current will then flow through the body diode of the switch device Q6. Thus, the zero voltage switching (ZVS) condition for the switch device Q6 is configured.

Figure 8C:
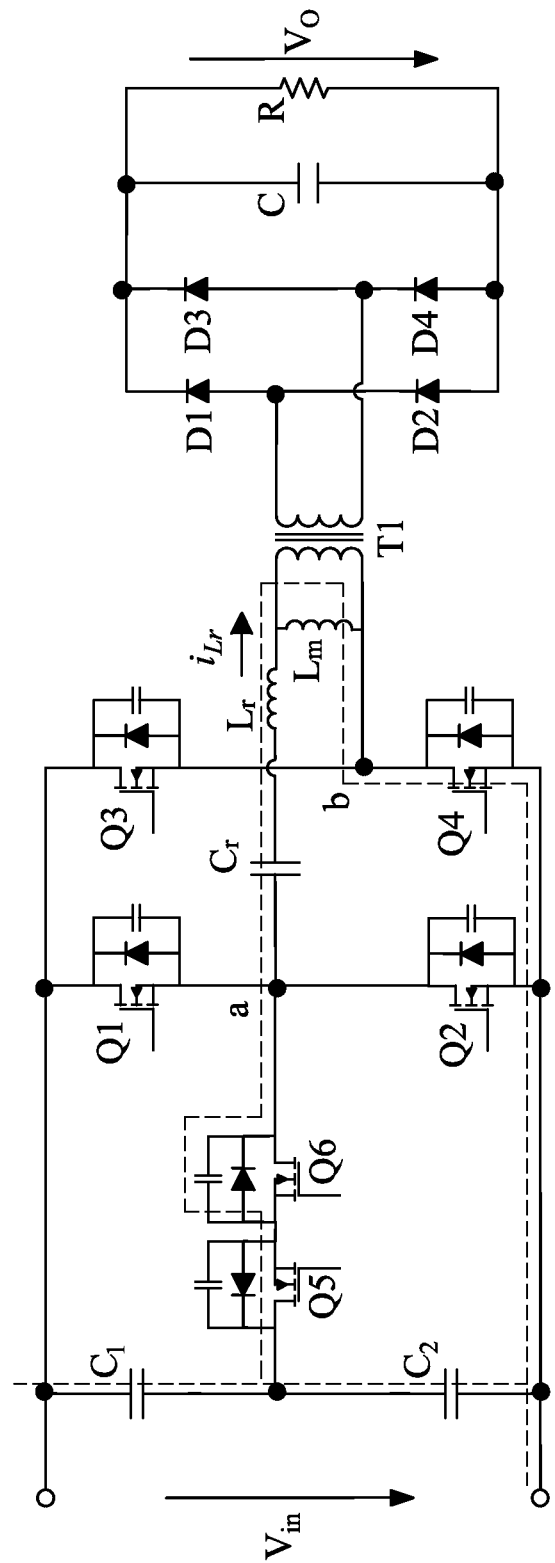

Then, as shown in FIG. 8C (a latter state of the operation during the time period t1-t2), the primary current $i_{Lr}$ flowing through the transformer T1 starts to flow through the capacitor C1, the switch device Q5, the body diode of the switch device Q6, the resonant capacitor Cr, the resonant inductor Lr, and the primary winding of the transformer T1, and the power is transferred from the primary side of the transformer T1 to the secondary side of the transformer T1.

Figure 8D:
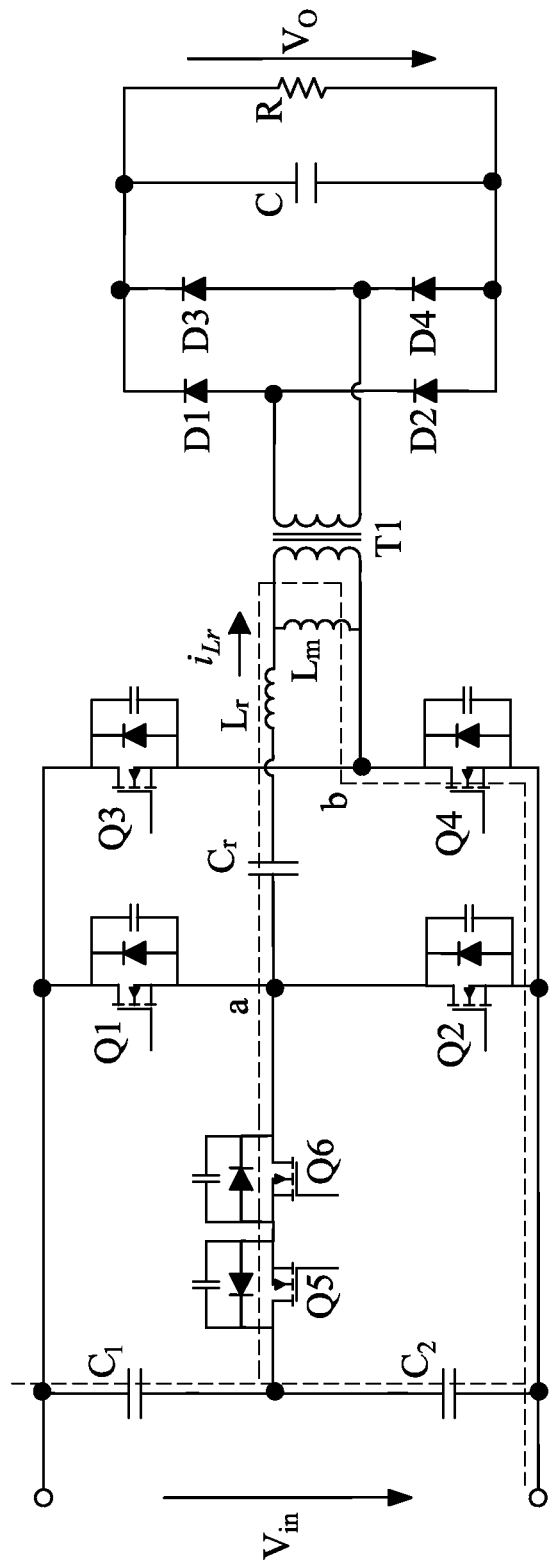

As shown in FIG. 7 and FIG. 8D, at time t2, the driving signal G6 is asserted, such that the switch device Q6 is switched on. The body diode of the switch device Q6 has already been conducted during the time period t1-t2, and thus the voltage across the switch device Q6 is zero when the switch device Q6 is switched on. In other words, the switch device Q6 can perform the ZVS operation to be switched on.

During the time period t2-t3, the switch devices Q4, Q5 and Q6 are switched on with the driving signals G4, G5 and G6 respectively, and thus the power converter may operate as a half-bridge LLC converter. Moreover, during the time period t2-t3, the output voltage $V_{AB}$ across the output terminals A and B of the bridge circuit is regulated to have the voltage level of V2 as well. In addition, the primary current $i_{Lr}$ flowing through the transformer T1 starts to flow through the capacitor C1, the switch device Q5, the switch device Q6, the resonant capacitor Cr, the resonant inductor Lr, and the primary winding of the transformer T1, and the power is transferred from the primary side of the transformer T1 to the secondary side of the transformer T1.

Figure 8E:
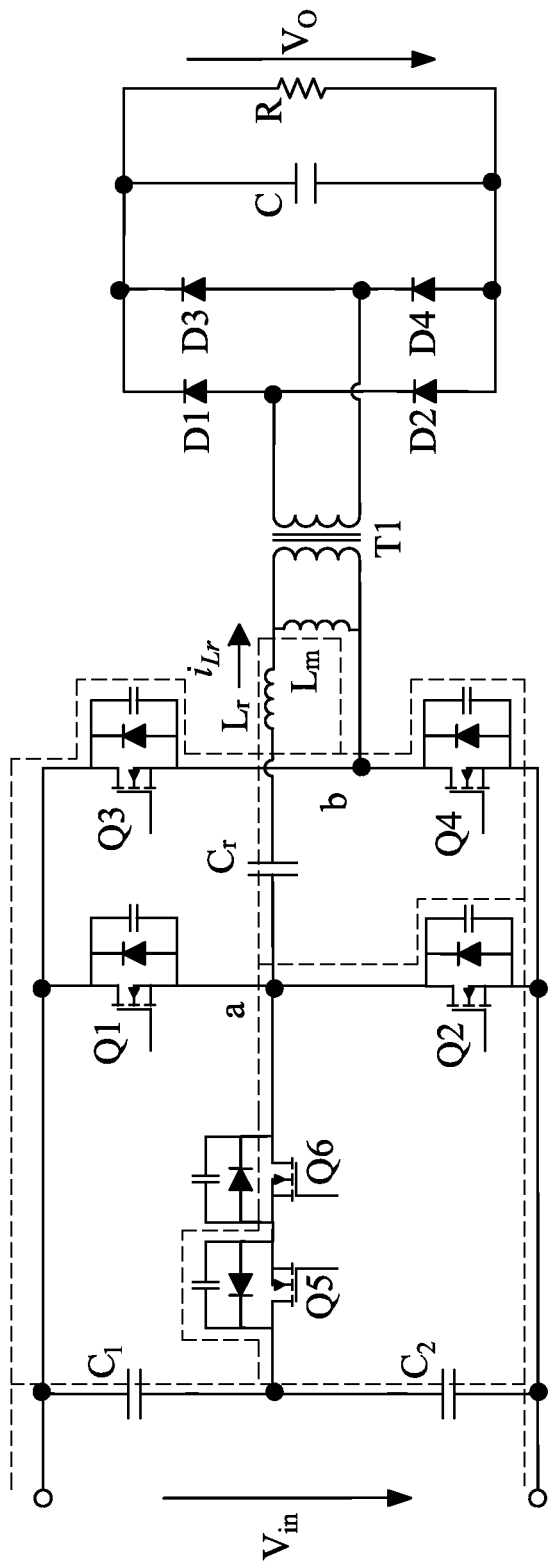

As shown in FIG. 7 and FIG. 8E (a former state of the operation during the time period t3-t4), at time t3, the driving signals G4 and G5 are de-asserted, such that the switch devices Q4 and Q5 are switched off. During the time period t3-t4, the output voltage $V_{AB}$ across the output terminals A and B of the bridge circuit is regulated to have the voltage level of V2 as well.

After the switch devices Q4 and Q5 are switched off, the energy stored in the inductors Lr and Lm starts to charge the parasitic capacitors of the switch devices Q4 and Q5 and to discharge the parasitic capacitors of the switch devices Q2 and Q3. After the charging and discharging operations are completed, the switch devices Q4 and Q5 are not conducted, and the voltages across the parasitic capacitors of the switch devices Q2 and Q3 respectively become zero, such that the current will then flow through the body diodes of the switch devices Q2 and Q3.

Figure 8F:
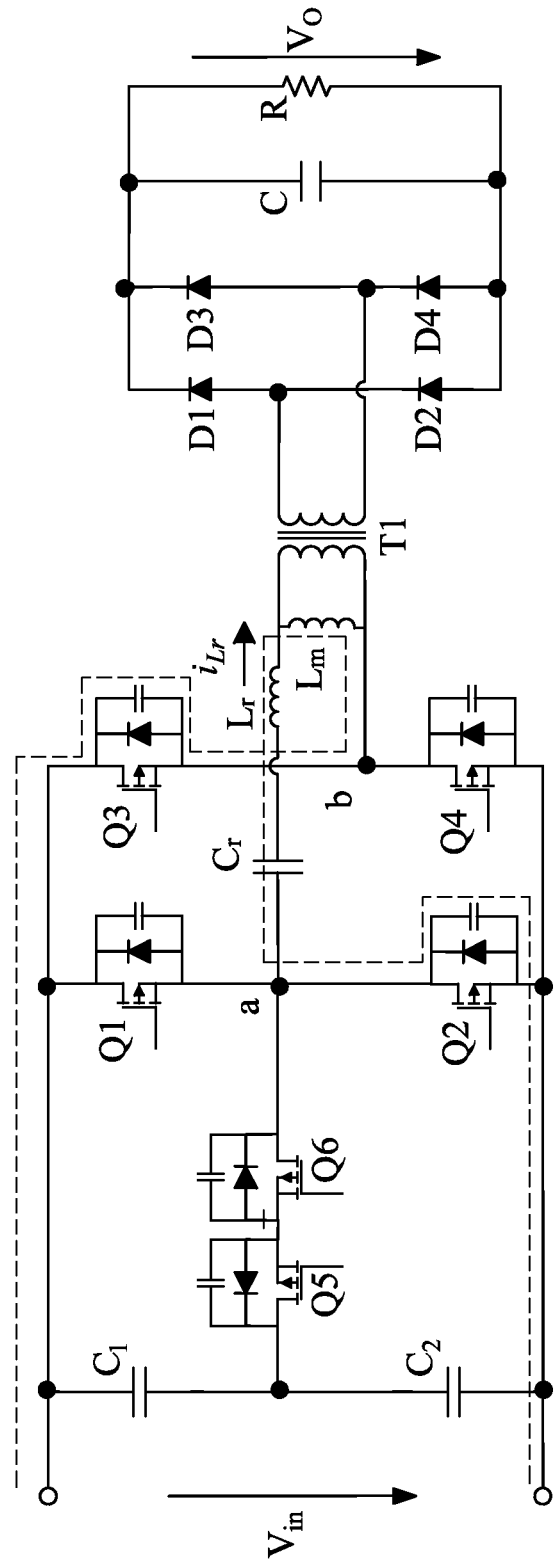

Then, as shown in FIG. 8F (a latter state of the operation during the time period t3-t4), the primary current $i_{Lr}$ flows through the body diode of the switch device Q2, the capacitor Cr, the inductors Lr and Lm, and the body diode of the switch device Q3. Thus, the zero voltage switching (ZVS) condition for the switch devices Q2 and Q3 is configured.

Figure 8G:
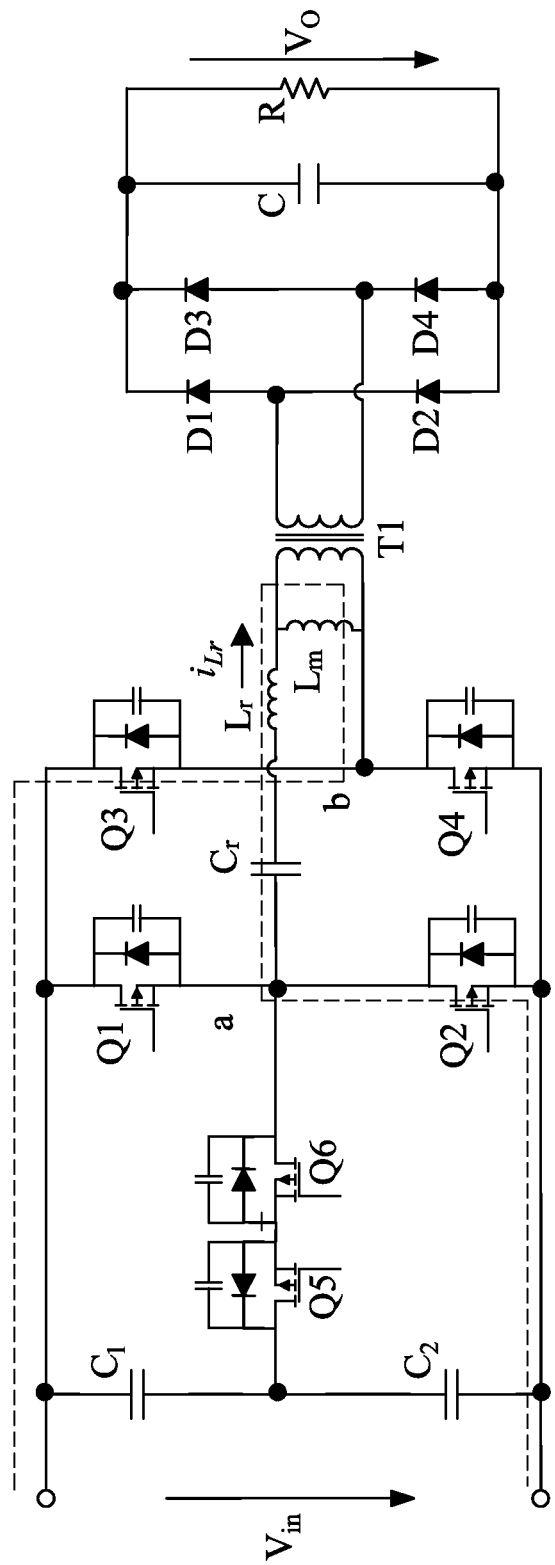

As shown in FIG. 7 and FIG. 8G, at time t4, the driving signals G2 and G3 are asserted, such that the switch devices Q2 and Q3 are switched on. The body diodes of the switch devices Q2 and Q3 have already been conducted during the time period t3-t4, and thus the voltages across the switch devices Q2 and Q3 are zero when the switch devices Q2 and Q3 are switched on. In other words, the switch devices Q2 and Q3 can perform the ZVS operation to be switched on.

Similar to the operation during the time period t0-t1, the switch devices Q2 and Q3 are switched on with the driving signals G2 and G3 respectively, and thus the power converter may operate as a full-bridge LLC converter. Moreover, during the time period t4-t5, the output voltage $V_{AB}$ across the output terminals A and B of the bridge circuit is regulated to have a voltage level of V3 which is different from V1 and V2. Similarly, during the time period t5-t6, the output voltage $V_{AB}$ across the output terminals A and B of the bridge circuit is regulated to have a voltage level of V4 which is different from V1, V2 and V3, in which the voltage levels of V1, V2, V3 and V4 are different one another. Notably, the operations during the time period t4-t6 are similar to those mentioned above in FIGS. 8A-8G and known by persons of ordinary skill in the art, and thus they are not further described in detail.

Another aspect of the present disclosure is related to a power converter which includes a full-bridge converter circuit and a regulation circuit, in which the full-bridge converter circuit includes a full-bridge circuit. The regulation circuit is configured for operatively regulating an output voltage across the output terminals of the full-bridge circuit by cooperating with the full-bridge converter circuit, such that the output voltage across the output terminals of the full-bridge circuit has more than three voltage levels.

Figure 9:
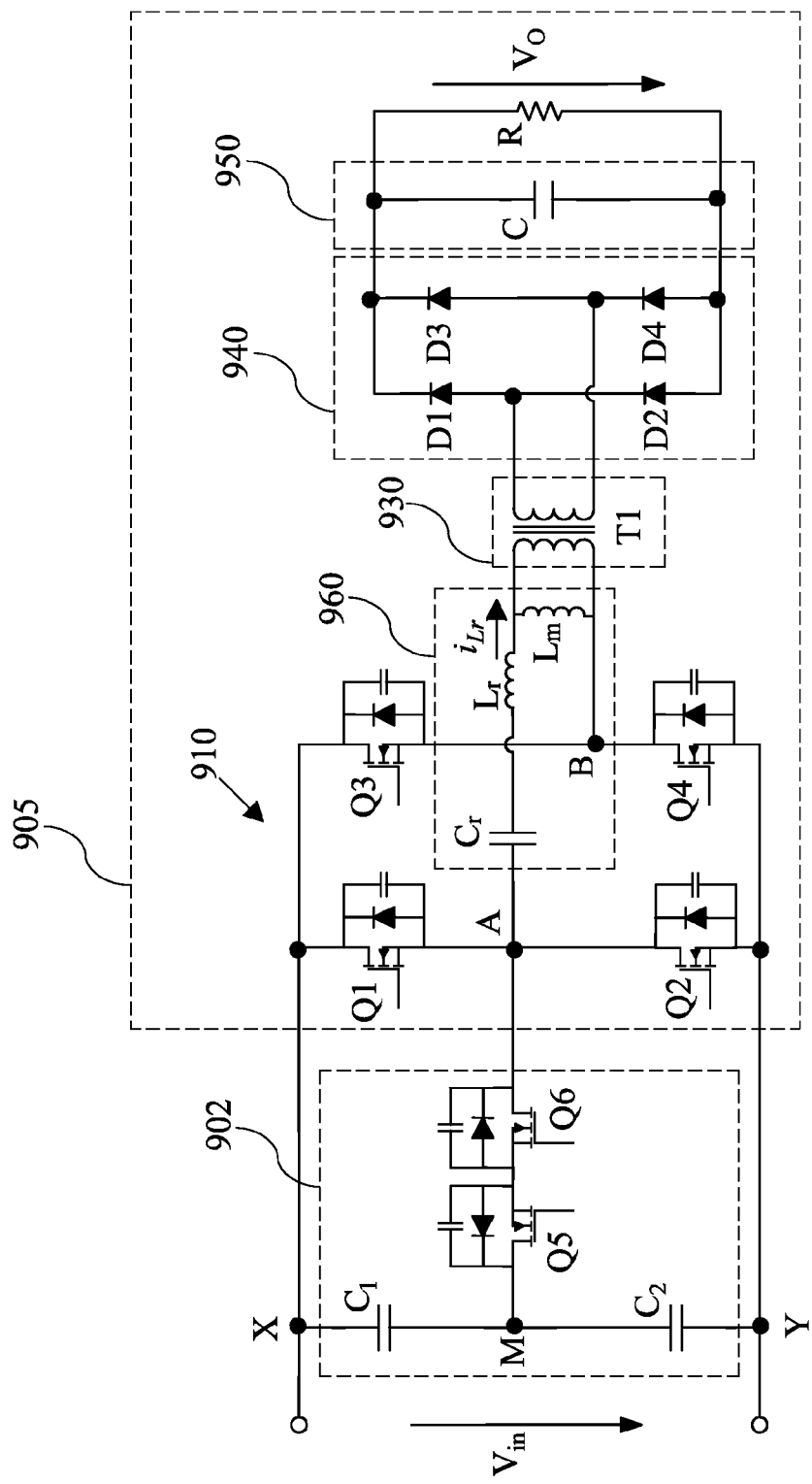
FIG. 9 is a schematic diagram of a power converter according to a seventh embodiment of the present disclosure.

FIG. 9 is a schematic diagram of a power converter according to a seventh embodiment of the present disclosure. As shown in FIG. 9, the power converter 900 includes a regulation circuit 902 and a full-bridge converter circuit 905. The full-bridge converter circuit 905 includes a full-bridge circuit 910 having input terminals X and Y and output terminals A and B. The regulation circuit 902 is bridged across the input terminals X and Y of the full-bridge circuit 910 and connected to the output terminal A of the full-bridge circuit 910. The regulation circuit 902 is configured for operatively regulating an output voltage $V_{AB}$ across the output terminals A and B of the full-bridge circuit 910 by cooperating with the full-bridge converter circuit 905, such that the output voltage $V_{AB}$ across the output terminals A and B of the full-bridge circuit 910 has more than three voltage levels.

In one embodiment, the full-bridge circuit 910 further includes switch devices Q1-Q4, in which the switch devices Q1-Q2 are connected in series at the output terminal A of the full-bridge circuit 910 and configured to be alternately switched on with a phase shift of 180 degree, and the switch devices Q3-Q4 are connected in series at the output terminal B of the full-bridge circuit 910 and configured to be alternately switched on with a phase shift of 180 degree.

In another embodiment, the regulation circuit 902 can further include two capacitor units (e.g., capacitors C1 and C2) and switch devices Q5 and Q6. The capacitors C1 and C2 are connected in series at a middle point M between the input terminals X and Y of the full-bridge circuit 910. The switch devices Q5 and Q6 are connected anti-serially between the middle point M and the output terminal A of the full-bridge circuit 910 and configured to be alternately switched on with a phase shift of 180 degree.

As illustrated in the aforementioned embodiments, the circuitry and operation of the power converter 900 can be configured similarly to the power converter 600 as shown in FIG. 6.

In yet another embodiment, the switch devices Q1 and Q6 are switched on respectively with the driving signals G1 and G6 (as shown in FIG. 7) which are complementary, the switch devices Q2 and Q5 are switched on respectively with the driving signals G2 and G5 (as shown in FIG. 7) which are complementary, and the switch devices Q3 and Q4 are switched on respectively with the driving signals G3 and G4 (as shown in FIG. 7) which are complementary.

In still another embodiment, the switch devices Q1 and Q4 are switched on simultaneously with the driving signals G1 and G4 (as shown in FIG. 7) respectively and the switch device Q1 is then switched off in advance, and the switch devices Q2 and Q3 are switched on simultaneously with the driving signals G2 and G3 (as shown in FIG. 7) respectively and the switch device Q2 is then switched off in advance.

In still yet another embodiment, a duty cycle of the driving signal G1 is smaller than a duty cycle of the driving signal G6, a duty cycle of the driving signal G2 is smaller than a duty cycle of the driving signal G5, and a duty cycle of the driving signal G3 is equal to a duty cycle of the driving signal G4.

Another aspect of the present disclosure is related to a method for controlling a power converter, in which the power converter can be configured as, but not limited to, one of the embodiments shown in FIG. 1 to FIG. 6, and thus it is not described in further detail. The method for controlling the power converter includes the steps which are illustrated below in conjunction with, for example, the power converter 600 shown in FIG. 6, and the waveforms regarding the control and regulation shown in FIG. 7.

In the present embodiment, the switch devices Q1 and Q6 are switched on respectively with the driving signals G1 and G6 which are complementary, the switch devices Q2 and Q5 are switched on respectively with the driving signals G2 and G5 which are complementary, and the switch devices Q3 and Q4 are switched on respectively with the driving signals G3 and G4 which are complementary, such that the output voltage $V_{AB}$ across the output terminals A and B of the full-bridge circuit 610 is regulated to have more than three voltage levels according to the operations of the switch devices Q1-Q6.

Specifically, the output voltage $V_{AB}$ across the output terminals A and B of the full-bridge circuit 610 is regulated to the voltage level V1 when the switch devices Q1, Q4 and Q5 are switched on by the driving signals G1, G4 and G5; the output voltage $V_{AB}$ is regulated to the voltage level V2 when the switch devices Q4 and Q5 are still switched on by the driving signals G4 and G5 and switch device Q1 are switched off by the driving signal G1; the output voltage $V_{AB}$ is regulated to the voltage level V3 when the switch devices Q2, Q3 and Q6 are switched on by the driving signals G2, G3 and G6; and the output voltage $V_{AB}$ is regulated to the voltage level V4 when the switch devices Q3 and Q6 are still switched on by the driving signals G3 and G6 and switch device Q2 are switched off by the driving signal G2, in which the voltage levels V1-V4 are different from one another.

In one embodiment, the driving signals G1 and G4 are asserted simultaneously and the driving signal G1 is then de-asserted in advance, and the driving signals G2 and G3 are asserted simultaneously and the driving signal G2 is then de-asserted in advance.

In another embodiment, the output voltage $V_{AB}$ across the output terminals A and B of the full-bridge circuit 610 is regulated to the voltage level V1 when the driving signal G1 is asserted, the output voltage $V_{AB}$ is regulated to the voltage level V2 when the driving signal G1 is de-asserted, the output voltage $V_{AB}$ is regulated to the voltage level V3 when the driving signal G2 is asserted, and the output voltage $V_{AB}$ is regulated to the voltage level V4 when the driving signal G2 is de-asserted, in which the voltage levels V1-V4 are different from one another.

In still another embodiment, the driving signals G1 and G2 are alternately asserted with a phase shift of 180 degree, the driving signals G3 and G4 are alternately asserted with a phase shift of 180 degree, and the G5 and G6 driving signals are alternately asserted with a phase shift of 180 degree.

In still yet another embodiment, a duty cycle of the driving signal G1 is smaller than a duty cycle of the driving signal G6, a duty cycle of the driving signal G2 is smaller than a duty cycle of the driving signal G5, and a duty cycle of the driving signal G3 is equal to a duty cycle of the driving signal G4.

Notably, the aforementioned steps are not necessarily recited in the sequence in which the steps are performed. That is, unless the sequence of the steps is expressly indicated, the sequence of the steps is interchangeable, and all or part of the steps may be simultaneously, partially simultaneously, or sequentially performed.

As is understood by a person skilled in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A power converter, comprising:
    a bridge circuit having a first and a second input terminal, and a first and a second output terminal, wherein the bridge circuit further comprises:
        a first bridge arm comprising two capacitor units connected in series at a middle point between the first and the second input terminals of the bridge circuit;
        a second bridge arm comprising a first and a second switch device connected in series at the first output terminal of the bridge circuit; and
        a third bridge arm comprising a third and a fourth switch device connected in series at the second output terminal of the bridge circuit;
    a switch module connected between the middle point and the first output terminal of the bridge circuit;
    an isolation stage having a first and a second input terminal, and a first and a second output terminal, wherein the first input terminal of the isolation stage is connected to the first output terminal of the bridge circuit, and the second input terminal of the isolation stage is connected to the second output terminal of the bridge circuit;
    an output stage having a first and a second output terminal, wherein the first input terminal of the output stage is connected to the first output terminal of the isolation stage, and the second input terminal of the output stage is connected to the second output terminal of the isolation stage; and
    a resonant tank comprising a capacitor unit and a first inductor unit connected in series between the first output terminal of the bridge circuit and the isolation stage;
    wherein the capacitor unit is directly connected to the first output terminal of the bridge circuit, and the first inductor unit is directly connected to the isolation stage.

2. The power converter as claimed in claim 1, wherein the switch module further comprises a fifth and a sixth switch device connected anti-serially between the middle point and the first output terminal of the bridge circuit.

3. The power converter as claimed in claim 2, further comprising:
    a control circuit for controlling the first to sixth switch devices, wherein the first and the sixth switch devices are switched on complementarily, the second and the fifth switch devices are switched on complementarily, and the third and the fourth switch devices are switched on complementarily.

4. The power converter as claimed in claim 3, wherein a duty cycle of the first switch device is smaller than a duty cycle of the sixth switch device, a duty cycle of the second switch device is smaller than a duty cycle of the fifth switch device, and a duty cycle of the third switch device is equal to a duty cycle of the fourth switch device.

5. The power converter as claimed in claim 1, wherein the bridge circuit is configured for generating a multi-level voltage having more than three voltage levels across the first and the second output terminals of the bridge circuit.

6. The power converter as claimed in claim 1, wherein the bridge circuit is characterized with a gain dependent on a first gain and a second gain, wherein the first gain is obtained when the bridge circuit operates as a half bridge circuit, and the second gain is obtained when the bridge circuit operates as a full-bridge circuit.

7. The power converter as claimed in claim 1, wherein the resonant tank further comprises:
    a second inductor unit, wherein the capacitor unit, the first inductor unit and the second inductor unit are connected in series between the first and the second output terminals of the bridge circuit.

8. A method for controlling a power converter, the power converter comprising a bridge circuit having a first and a second input terminal and a first and a second output terminal, a switch module, an isolation stage connected to the bridge circuit, and an output stage connected to the isolation stage, wherein the bridge circuit further comprises two capacitor units connected in series at a middle point between the first and the second input terminals of the bridge circuit, a first and a second switch device connected in series at the first output terminal of the bridge circuit, and a third and a fourth switch device connected in series at the second output terminal of the bridge circuit, wherein the switch module further comprises a fifth and a sixth switch device connected anti-serially between the middle point and the first output terminal of the bridge circuit, wherein the power converter further comprises a resonant tank comprising a capacitor unit and a first inductor unit connected in series between the first output terminal of the bridge circuit and the isolation stage, wherein the capacitor unit is directly connected to the first output terminal of the bridge circuit, and the first inductor unit is directly connected to the isolation stage the method comprising:
    switching on the first and the sixth switch devices respectively with a first and a sixth driving signal which are complementary;
    switching on the second and the fifth switch devices respectively with a second and a fifth driving signal which are complementary; and
    switching on the third and the fourth switch devices respectively with a third and a fourth driving signal which are complementary.

9. The method as claimed in claim 8, wherein the first and the fourth switch devices are switched on simultaneously while the fifth switch device is still switched on, the first switch device is switched off while the fourth and the fifth switch devices are still switched on, the second and the third switch devices are switched on simultaneously while the sixth switch device is still switched on, and the second switch device is switched off while the third and the sixth switch devices are still switched on.

10. The method as claimed in claim 8, wherein the first and the fourth driving signals are asserted simultaneously and the first driving signal is then de-asserted in advance, and the second and the third driving signals are asserted simultaneously and the second driving signal is then de-asserted in advance.

11. The method as claimed in claim 8, wherein an output voltage across the first and the second output terminals of the bridge circuit is regulated to a first voltage level when the first driving signal is asserted, the output voltage is regulated to a second voltage level when the first driving signal is de-asserted, the output voltage is regulated to a third voltage level when the second driving signal is asserted, and the output voltage is regulated to a fourth voltage level when the second driving signal is de-asserted, wherein the first to fourth voltage levels are different from one another.

12. The method as claimed in claim 8, wherein the first and the second driving signals are alternately asserted with a phase shift of 180 degrees, the third and the fourth driving signals are alternately asserted with a phase shift of 180 degrees, and the fifth and the sixth driving signals are alternately asserted with a phase shift of 180 degree.

13. The method as claimed in claim 8, wherein a duty cycle of the first driving signal is smaller than a duty cycle of the sixth driving signal, a duty cycle of the second driving signal is smaller than a duty cycle of the fifth driving signal, and a duty cycle of the third driving signal is equal to a duty cycle of the fourth driving signal.

14. A power converter, comprising:
a full-bridge converter circuit comprising a full-bridge circuit, the full-bridge circuit having a first and a second input terminal and a first and a second output terminal;
a regulation circuit bridged across the first and the second input terminals of the full-bridge circuit and connected to the first output terminal of the full-bridge circuit, the regulation circuit configured for operatively regulating an output voltage across the first and the second output terminals of the full-bridge circuit by cooperating with the full-bridge converter circuit, such that the output voltage across the first and the second output terminals of the full-bridge circuit has more than three voltage levels;
an isolation stage having a first and a second input terminal, and a first and a second output terminal, wherein the first input terminal of the isolation stage is connected to the first output terminal of the full-bridge circuit, and the second input terminal of the isolation stage is connected to the second output terminal of the full-bridge circuit; and
a resonant tank comprising a first capacitor unit and a first inductor unit connected in series between the first output terminal of the full-bridge circuit and the isolation stage;
wherein the first capacitor unit is directly connected to the first output terminal of the full-bridge circuit, and the first inductor unit is directly connected to the isolation stage.

15. The power converter as claimed in claim 14, wherein the full-bridge circuit further comprises:
a first and a second switch device connected in series at the first output terminal of the full-bridge circuit and configured to be alternately switched on with a phase shift of 180 degrees; and
a third and a fourth switch device connected in series at the second output terminal of the full-bridge circuit and configured to be alternately switched on with a phase shift of 180 degrees.

16. The power converter as claimed in claim 15, wherein the regulation circuit further comprises:
a second capacitor unit and a third capacitor unit connected in series at a middle point between the first and the second input terminals of the full-bridge circuit; and
a fifth and a sixth switch device connected anti-serially between the middle point and the first output terminal of the full-bridge circuit and configured to be alternately switched on with a phase shift of 180 degree.

17. The power converter as claimed in claim 16, wherein the first and the sixth switch devices are switched on respectively with a first and a sixth driving signal which are complementary, the second and the fifth switch devices are switched on respectively with a second and a fifth driving signal which are complementary, and the third and the fourth switch devices are switched on respectively with a third and a fourth driving signal which are complementary.

18. The power converter as claimed in claim 17, wherein the first and the fourth switch devices are switched on simultaneously with the first and the fourth driving signal respectively and the first switch device is then switched off in advance, and the second and the third switch devices are switched on simultaneously with the second and the third driving signal respectively and the second switch device is then switched off in advance.

19. The power converter as claimed in claim 17, wherein a duty cycle of the first driving signal is smaller than a duty cycle of the sixth driving signal, a duty cycle of the second driving signal is smaller than a duty cycle of the fifth driving signal, and a duty cycle of the third driving signal is equal to a duty cycle of the fourth driving signal.

* * * * *